United States Patent
Lin

(10) Patent No.: US 10,706,458 B2
(45) Date of Patent: Jul. 7, 2020

(54) GIVE-AND-TAKE PLATFORM

(71) Applicant: Yoger, Inc., Baldwin Park, CA (US)

(72) Inventor: Shou-Lung Lin, Baldwin Park, CA (US)

(73) Assignee: Yoger, Inc., Baldwin Park, CA (US)

( * ) Notice: Subject to any disclaimer, the term of this patent is extended or adjusted under 35 U.S.C. 154(b) by 191 days.

(21) Appl. No.: 15/747,113

(22) PCT Filed: Apr. 25, 2017

(86) PCT No.: PCT/US2017/029223
§ 371 (c)(1),
(2) Date: Jan. 23, 2018

(87) PCT Pub. No.: WO2018/169557
PCT Pub. Date: Sep. 20, 2018

(65) Prior Publication Data
US 2019/0197604 A1  Jun. 27, 2019

Related U.S. Application Data

(60) Provisional application No. 62/471,911, filed on Mar. 15, 2017.

(51) Int. Cl.
| G06Q 30/00 | (2012.01) |
| G06Q 30/06 | (2012.01) |
| G06Q 20/22 | (2012.01) |
| G06Q 20/06 | (2012.01) |
| G06Q 10/08 | (2012.01) |
| G06Q 50/00 | (2012.01) |

(52) U.S. Cl.
CPC ........ *G06Q 30/0643* (2013.01); *G06Q 10/08* (2013.01); *G06Q 20/0655* (2013.01); *G06Q 20/22* (2013.01); *G06Q 30/0627* (2013.01); *G06Q 50/01* (2013.01)

(58) Field of Classification Search
None
See application file for complete search history.

(56) References Cited

U.S. PATENT DOCUMENTS

| 2006/0026077 A1* | 2/2006 | Silverman | ........ G06Q 30/0601 705/26.1 |
| 2009/0099969 A1* | 4/2009 | Hoeg | .............. G06Q 30/00 705/80 |

(Continued)

OTHER PUBLICATIONS

International Search Report & Written Opinion dated Jul. 27, 2017 from corresponding PCT Application No. PCT/US2017/029223.

*Primary Examiner* — Mila Airapetian
(74) *Attorney, Agent, or Firm* — Innovation Capital Law Group, LLP; Vic Lin

(57) ABSTRACT

An on-line give-and-take platform is provided. The platform presents one or more giveaway items to a plurality of user accounts of a give-and-take platform. Each giveaway item is posted by a user account. At least two of the giveaway items have different market values. Any user account is allowed to acquire any one of the presented giveaway items by spending one unit credit. The platform receives a notification of a first user account indicating intent to acquire a particular giveaway item that is posted by a second user account. The platform accrues one unit credit to the second user account and removing one unit credit from the first user account.

20 Claims, 13 Drawing Sheets

(56) References Cited

U.S. PATENT DOCUMENTS

| | | | |
|---|---|---|---|
| 2010/0318571 A1* | 12/2010 | Pearlman | H04L 63/104 |
| | | | 707/784 |
| 2012/0304305 A1* | 11/2012 | Efraimov | G06F 21/33 |
| | | | 726/27 |
| 2014/0089141 A1* | 3/2014 | Savukoski | G06Q 30/0603 |
| | | | 705/26.44 |
| 2015/0185034 A1 | 7/2015 | Abhyanker | |
| 2015/0269614 A1* | 9/2015 | Kramer | G06Q 30/0251 |
| | | | 705/14.49 |
| 2015/0334200 A1 | 11/2015 | Clark | |
| 2016/0260155 A1* | 9/2016 | Landsman | G06Q 30/0631 |
| 2017/0024712 A1 | 1/2017 | Mariasov | |
| 2017/0098170 A1* | 4/2017 | Sardela Bianchi | G06Q 30/061 |
| 2017/0316478 A1* | 11/2017 | Hammond | G06Q 30/06 |
| 2018/0158118 A1* | 6/2018 | Tolbert | G06Q 30/06 |

\* cited by examiner

GIVE-AND-TAKE PLATFORM

BACKGROUND

Technical Field

The present disclosure generally relates to providing an on-line platform for exchanging good and services.

Description of the Related Art

E-commerce is a transaction of buying or selling online. Electronic commerce draws on technologies such as mobile commerce, electronic funds transfer, supply chain management, Internet marketing, online transaction processing, electronic data interchange (EDI), inventory management systems, and automated data collection systems. Modern electronic commerce typically uses the World Wide Web for at least part of the transaction's life cycle, although it may also use other technologies such as e-mail.

SUMMARY

Some embodiments provide an on-line give-and-take platform. The platform presents one or more giveaway items to a plurality of user accounts of a give-and-take platform. Each giveaway item is posted by an account of the platform. At least two of the giveaway items have different market values. Any account is allowed to acquire any one of the presented giveaway items by spending one unit credit. The platform receives a notification from a first account indicating intent to acquire a particular giveaway item that is posted by a second account. The platform accrues one unit credit to the second account and removing one unit credit from the first account.

Some embodiments provide a software application to a computing device, the software application when executed by one or more processing units of the computing device configures the computing device to provide a user interface (UI) to a first user account of a plurality of user accounts of the give-and-take platform. The UI includes a first display area for presenting a set of giveaway items, each giveaway item posted by a user account of the platform, wherein at least two of the giveaway items have different market values, wherein the first account is allowed to acquire any one of the presented giveaway items by spending one unit credit. The UI also includes a first selection item for selecting one giveaway item in the set of giveaway items. The UI also includes a second display area for displaying one or more unit credits that is available to the first account. A user account earns each unit credit by posting a giveaway item at the platform and having the posted giveaway item taken by another user account.

In some embodiments, the give-and-take platform receives a request to transfer a physical item from a first user account to a second user account. The request includes a first account identifier of the first user account and a second account identifier of the second user account. The platform maps the first account identifier to a first physical location and a second account identifier to a second physical location. The platform transmits the first and second physical locations to a shipping agent to instruct the shipping agent to pick up the physical item from the first physical location and deliver physical item to the second physical location.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments provide an on-line give-and-take platform that makes the act of giving, sharing and donating goods and/or services more convenient. It aims to reduce wastage, circulate material value, and is based on the fundamentally human give-and-take behavior. The on-line give-and-take platform allows people to maximize material resource sharing via social networks. One can post items they would like to give away on the give-and-take platform and take items posted by others on the give-and-take platform for free. The give-and-take platform allows a user to share or dispose of something that is no longer needed, and in return, receive something that the user want or need that someone else does not. The give-and-take platform also facilitates building a social network and enhances social experiences through sharing.

The give-and-take platform is a social sharing platform that facilitates exchange of goods and services between users (also referred to as members) of the platform based on personal need rather than monetary value. To "take" or to acquire a good or service item from the platform costs only one unit credit, or one "take point" and no more, regardless of the actual monetary value of the item taken. In other words, a "take point" is a token that reflects the value that the giver or taker personally assigns to an item being exchanged on the platform, rather than the open-market value of the item. A user of the platform can earn a "take point" by posting a giveaway item at the platform and having that item taken by another. The earned "take point" entitles the user to take an item from the platform by spending or redeeming the "take point". The platform keeps track of the take points accrued to each user at each user's account.

As a further incentive for giving, some embodiments associate take points with meanings, e.g., birthday, limited edition, valentine, etc. Some embodiments associate each "take point" with designed graphics to illustrate the take point's corresponding meaning. Hence, a user may accrue take points with different graphics to express different meanings.

Figure 1:
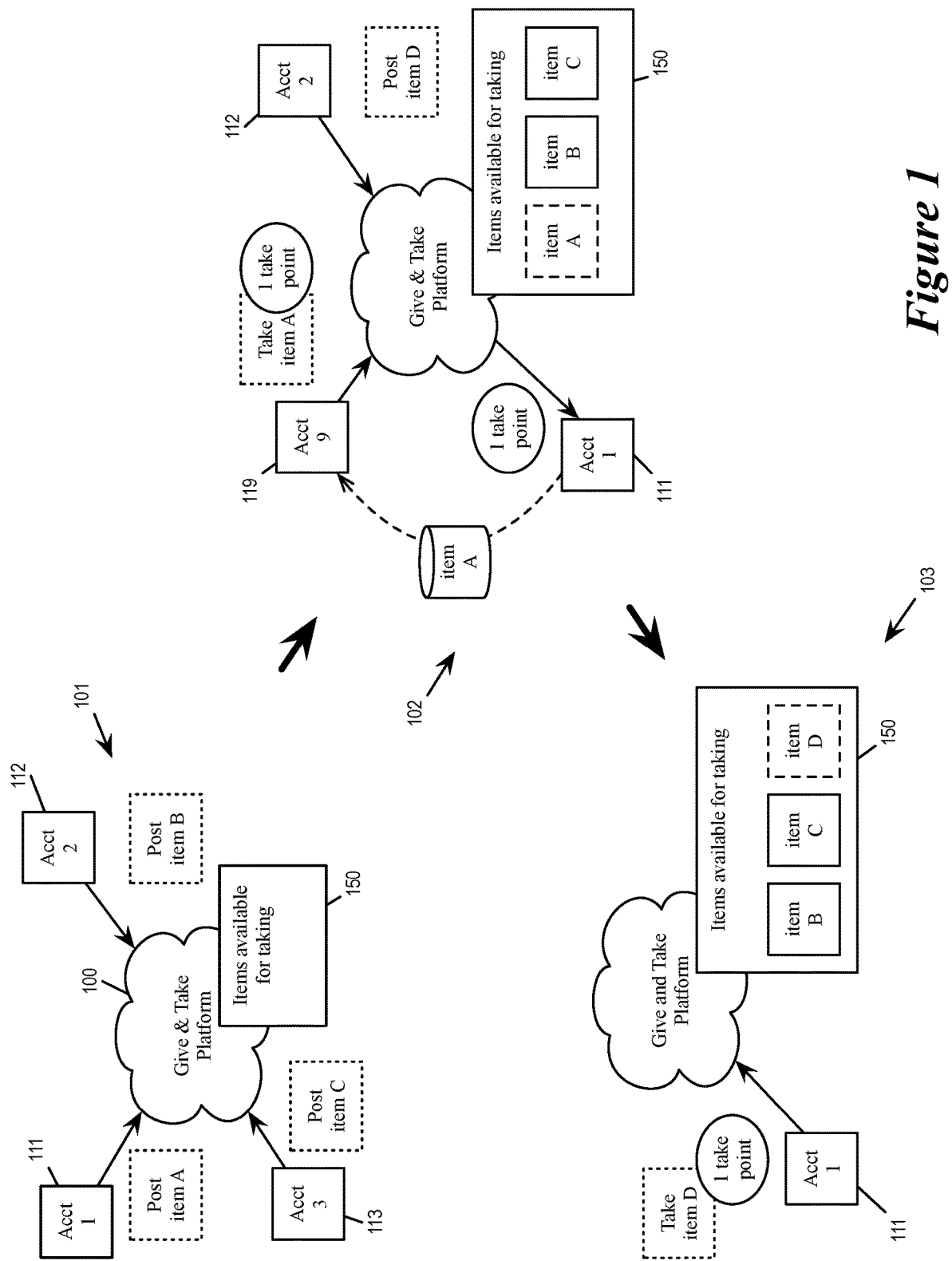
FIG. 1 illustrates a give-and-take platform that facilitates exchange of goods and services through take points.

FIG. 1 illustrates a give-and-take platform 100 that facilitates exchange of goods and services through take points. The figure illustrates several users of the platform exchanging goods and services by posting giveaway items on the platform, taking items from the platform, and earning and spending take points at the platform. The platform keeps track of the posted giveaway items in a giveaway posting 150.

The figure illustrates three stages 101-103 of give-and-take transactions at the platform 100 based on take points.

The first stage 101 shows several users using the platform to post items that they are willing to give away. At this initial stage, no giveaway item is posted as being available for taking, and the platform's giveaway posting 150 is empty. In some embodiments, each user of the platform has a corresponding user account at the platform for keeping track of the user's take points, shipping location, transaction history and statistics, and/or other personal information. Each member/user interacts with the platform as an account user, and the platform interacts with each user through his or her user account. As illustrated, the figure shows user accounts 111, 112, and 113 (accounts 1, 2, 3, respectively) each posting an item (items A, B, C respectively) on the platform 100.

The second stage 102 shows several giveaway items (items A, B, C) being posted at the giveaway posting 150 as being available for taking. In some embodiments, each posted giveaway item has an associated privacy setting imposed by its donor user account so only a subset of the users of the platform may see the giveaway item. Each user account may post multiple items. For example, the user account 112 (account 2) has already posted one item (item B) and is posting one additional item (item D).

The stage also illustrates a user account 119 (account 9) taking one of the giveaway items (item A posted by user account 111) from the platform 100. The platform facilitates the physical shipping of the item A from a physical location of the giver user account 111 to a physical location of the taker user account 119. The platform also accrues one take point to the giver user account 111 for giving away an item and removes (or cancels) one take point from the taker user account 119 for taking an item. In some embodiments, the platform holds off accruing the take point to the giver's account until the giveaway item is out of the physical possession of the giver (e.g., when a courier has picked up the item for shipment). In some embodiments, the platform holds off accruing the take point to the giver's account until the item is in the possession in of the receiver/taker user (by waiting for confirmation of receipt from the receiver user or by waiting for a particular period of time, say 24 hours, after successful delivery of the item.)

Figure 9:
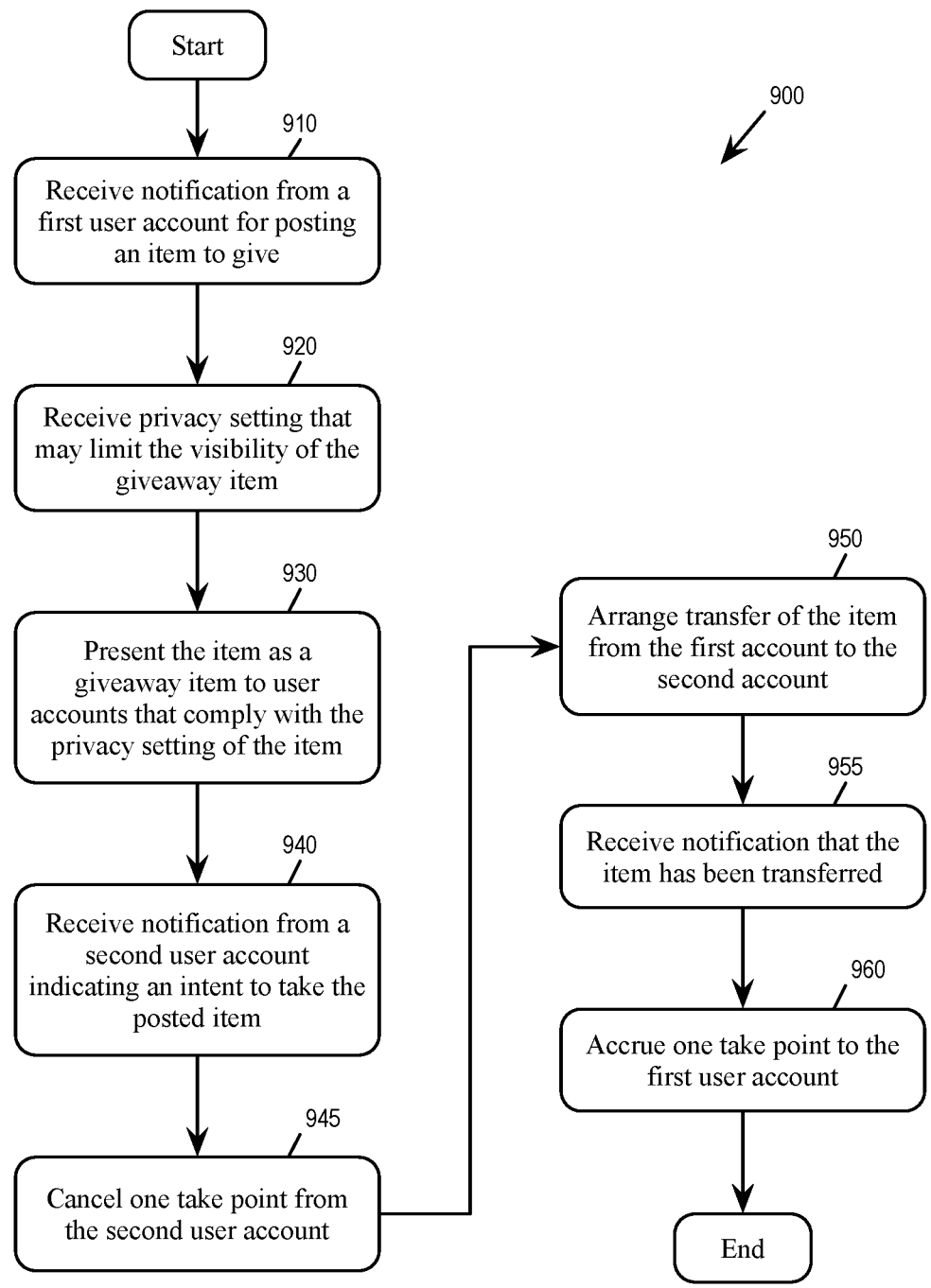
FIG. 9 conceptually illustrates a process performed by the give-and-take platform to manage the transaction of giveaway items based on take points.

On the other hand, the platform removes the take point from the taker's account as soon as the taking user commits to taking the item (e.g., by clicking a confirm to take button on a user interface of the give-and-take platform). If the transaction fell through, the platform would reinstate the take point to the taker's account and remove the corresponding take point from the giver's account. FIG. 9 below further describes operations of a give-and-take transaction based on take points.

The third stage 103 illustrates a giver user using an earned take point to take an item from the platform 100. As illustrated, the giver account 111 of the previous stage uses (or redeems) his earned take point to take the item D from the giveaway posting 150.

A user of the give-and-take platform may earn a take point by posting an item at the platform as a giveaway and have that giveaway item taken. To prevent users from "gaming" that platform, the platform in some embodiments accrues a take point to an account only if a corresponding take point is removed another account. In some embodiments, the platform also allows its users to earn take points by participating in an activity promoted by the platform that generate take points, such as signing up as a new member/user, giving items to a donation campaign, or supporting an advertising campaign. This allows the platform to create and inject take points into the give-and-take system and regulates the circulation of the take points in the give-and-take system.

In some embodiments, the platform facilitates targeted giving, i.e., instead of posting a giveaway item on the platform and waiting for another user to redeem a take point to take the item, a user may designate another user of the platform to receive an item. In this scenario, the giver user account does not earn a take point and the taker user account does not spend a take point. However, a user may spend a take point to take a giveaway item from the platform and designate another user of the platform to receive the taken giveaway item.

In some embodiments, a user of the platform may post a wish list, informing other users of the platform of the items that he or she desires. Another user of the platform upon viewing the wish list may decide to give an item listed in the wish list to the wishing user. In addition to wish lists, the platform in some embodiments generates notifications or reminders based on personal information in a particular user account (e.g., birthday reminders) so that another user upon receiving such a notification may designate the particular user account as the receiver of an item in a targeted giving transaction.

Figure 2:
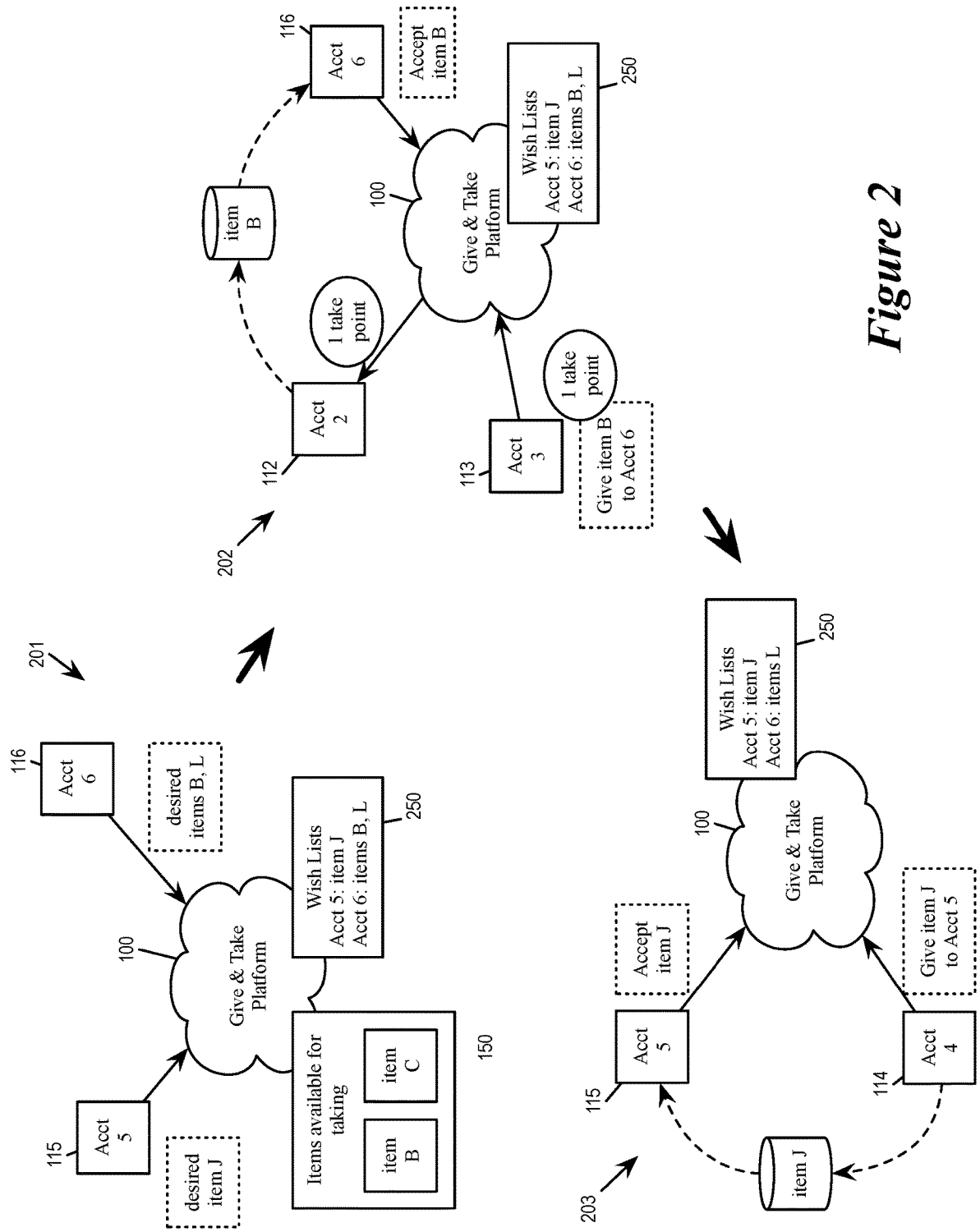
FIG. 2 illustrates targeted giving at the give-and-take platform.

FIG. 2 illustrates an example targeted giving transaction at the give-and-take platform 100. The figure illustrates several users posting their desired items in a wish list 250 on the platform. A giver user designates a wishing user as a receiver of an item and gives the item. The figure illustrates three stages 201-203 of the targeted-giving transaction at the platform 100.

The first stage 201 shows user accounts posting their desired items at the platform 100. As illustrated, a user account 115 (account 5) posts a desired item J and a user account 116 (account 6) posts desired items B and L at the wish list 250. A desired item can be a giveaway item listed in the giveaway posting 150 of the platform, or an item that is not a giveaway item at the platform. In this example, the desired item B is a giveaway item posted at the platform, while the desired items J and L are not.

The second stage 202 shows the user account 113 (account 3) giving the item B to the user account 116 (account 6) in a targeted-giving operation. Since item B is a giveaway item of the platform posted by the user account 112 (see stage 101 of FIG. 1), the user account 113 has to spends one take point to take the item B from the giveaway posting 150 to give to the user account 116 (account 6). In some embodiments, the user interface of the platform let the user account 113 gives item B to user account 116 by simply selecting item B from the wish list posting 250. The platform would remove one take point from user account 113, arrange transfer or shipment of the item from the user of the account 112 to the user of the account 116, and accrue one take point to the account 112.

The third stage 203 shows the user account 114 (account 4) designating the user account 115 (account 5) as the receiver for the item J through the platform 100. Item J is a desired item of the user account 114, but item J is not a giveaway item posted at the platform. This targeted-giving operation therefore does not involve any take points. The platform would nevertheless facilitate the transfer of the item J from the user of the account 114 to the user of the account 115.

Figure 10:
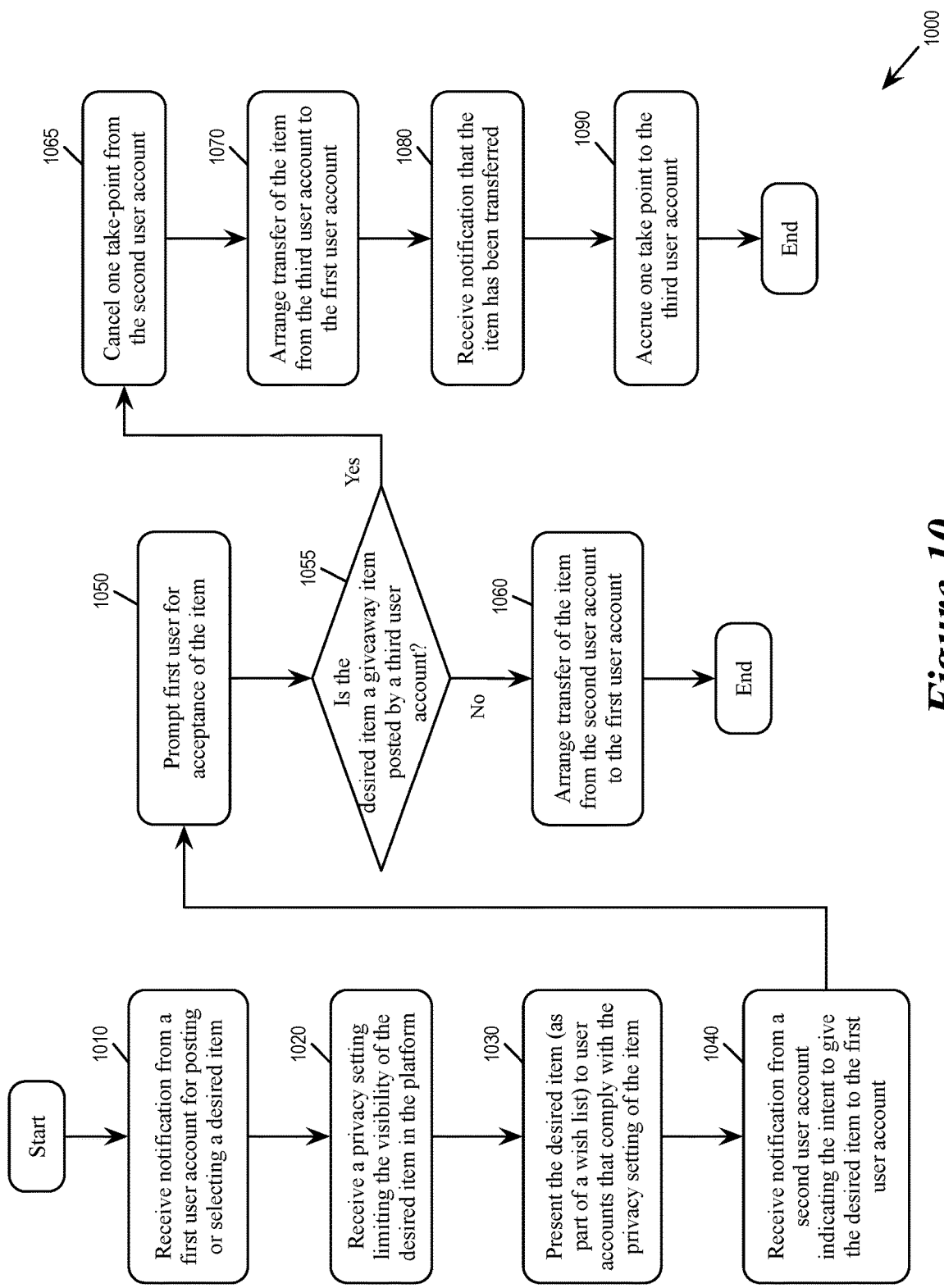
FIG. 10 conceptually illustrates a process performed by the give-and-take platform to manage targeted-giving transactions.

In a targeted-giving transaction, the platform would proceed with the transfer of the given item only after the receiver has indicated acceptance of the item. The platform would notify the proposed receiver user of an item that another user is sending his way. The proposed receiver may decline or accept the item by using the user interface of the platform. The platform would abort the targeted-giving transaction if the proposed receiver declines the item. FIG. 10 below further describes operations of a targeted-giving transaction at the give-and-take platform.

As mentioned, the give-and-take platform is a platform for exchanging goods and services, and the platform facilitates the transfer of goods and services between user accounts. An item being transferred can be a virtual item such as a credit (e.g., a take point), a license to use an intellectual property, or a promise to perform a service. An item being transferred can also be a physical item requiring physical shipment. In order to make giving and sharing of physical items as convenient as possible for the users of the give-and-take platform, the platform in some embodiments facilitates shipping of physical items by using account information stored at a database to automatically determine the physical shipping location of the giver and taker. A giver user merely has to select a receiver at a user interface of the platform and the platform would provide the necessary shipping information to a shipping agency. The shipping agency can use the provided physical locations to physically pick up the item from the giver and deliver the item to the taker/receiver.

In the example of FIGS. 1 and 2, the platform facilitates the physical shipping of the item A from the giver user 111 (account 1) to the taker user 119 (account 9), the shipping of the item B from the giver user 112 (account 2) to receiver the user 116 (account 6), as well as the shipping of the item J from the giver user 114 to the receiver user 115. In some embodiments, a user may use the shipping capability of the platform to send an item to another member, not necessarily as part of a giving transaction involving take points, but for the convenience of shipping to a fellow user by simply selecting the fellow user's account identifier. In other words, the platform facilitates shipping by account identification rather than by physical location or address.

Figure 3A:
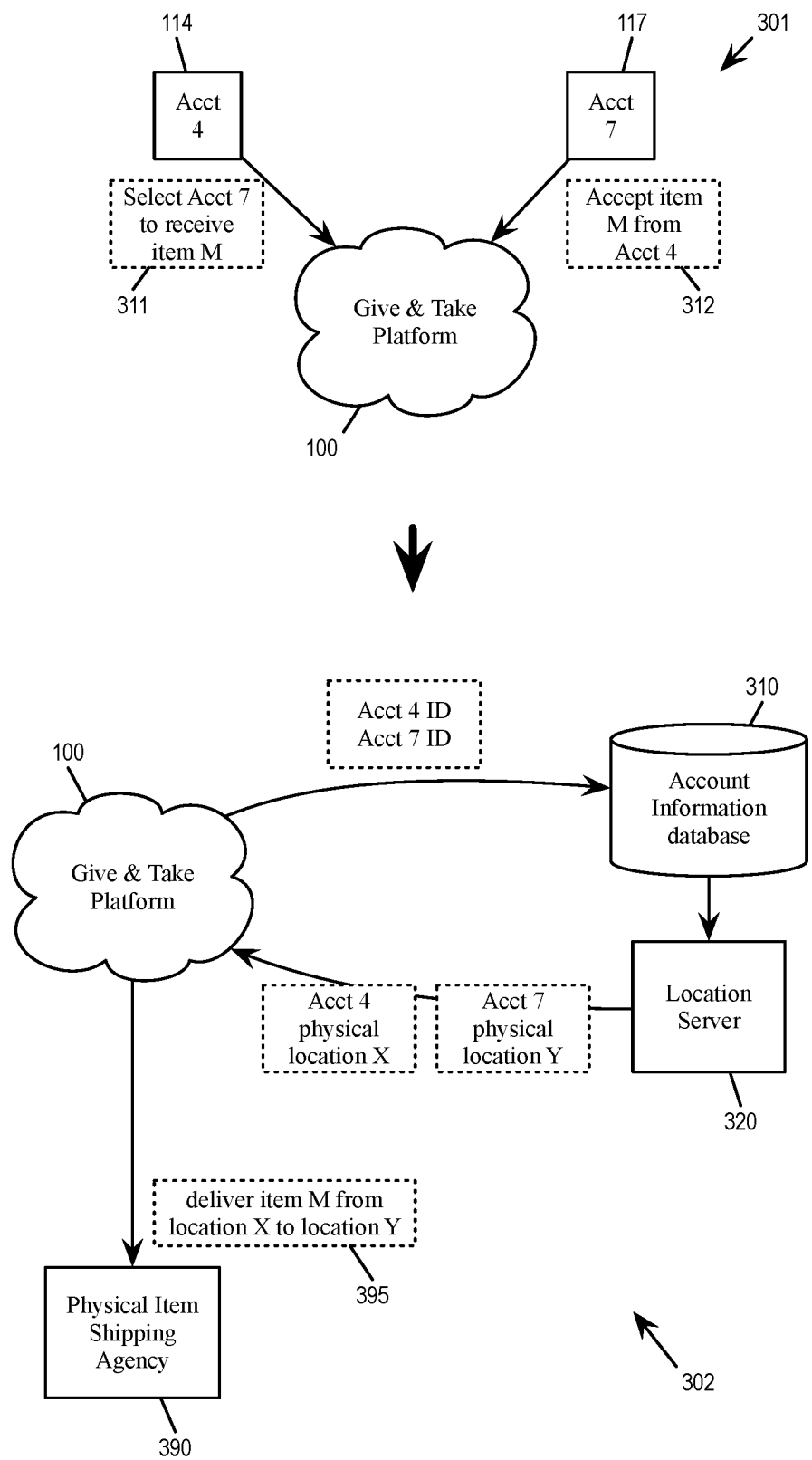
FIGS. 3A-B shows the give-and-take platform facilitating shipping from a giver account user to a taker/receiver account user.
Figure 3B:
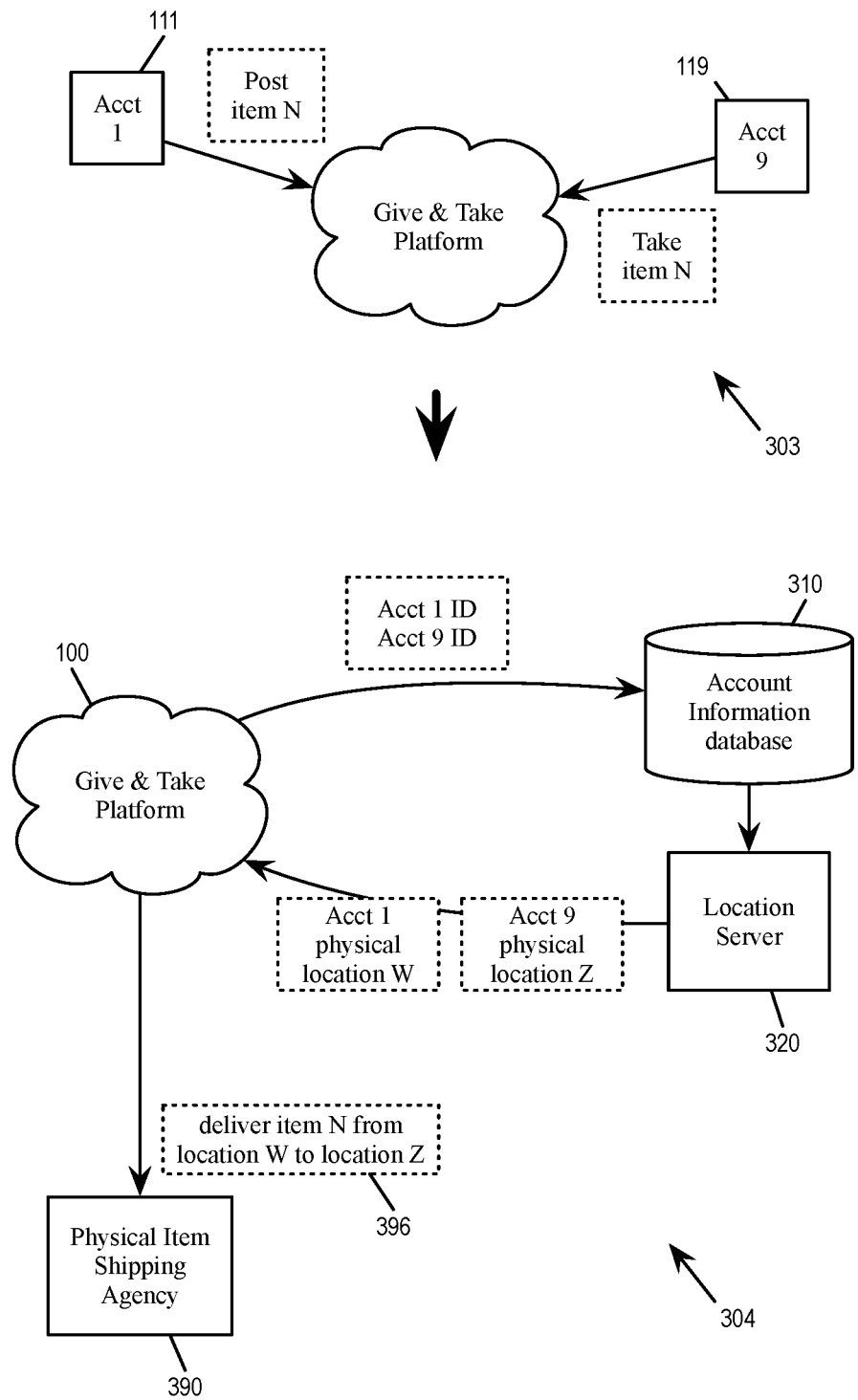

FIGS. 3A-B shows the give-and-take platform 100 facilitating shipping from a giver user to a taker/receiver user. The figure shows a user of the platform using the platform's shipping facility to physically ship one item to another user. The sender user may be a giver user who is sending a giveaway item posted on the platform to a taker user, or a giver user sending a desired item to a receiver user in a targeted-giving transaction, or a sender user using the platform to ship an item to another user without spending or earning any take points.

The figure illustrates the platform facilitating shipping of a physical item by account identification in four stages 301-304.

At the first stage 301, the user account 114 (account 4) has selected the user account 117 (account 7) as the receiver of an item M. The receiver user 117 may be a taker user who takes the giveaway item M by redeeming a take point, or a wishing user who has posted a desired item in the wish list 250. The user 114 uses the user interface of the platform to select the user account 117 as receiver without having to fill out any shipping information. The selection in turn generates a request notification 311 to the platform that indicates that the user 114 intend to send the item M to the user 117. The receiver user 117 in turn generates an accept notification 312 to the platform 100. In some embodiments, for security and privacy reasons, the platform 100 would wait until it has received an "accept" notification from the receiver account 117 before actually providing shipping information to a shipping agency for shipping. The request and/or accept notifications include account identities of the sender user and of the receiver user.

At the second stage 302, after the receiving the sender request notification 311 and the receiver accept notification 312, the platform generates shipping instructions 395 (e.g., shipping labels) to a shipping agency 390 to deliver the item M from the user of the account 114 to the user of the account 117. The platform generates the shipping instructions by mapping the account identifier of the accounts 114 to a physical location X and the account identifier of the account 117 to a physical location Y. The shipping instruction includes the physical locations X and Y so the shipping agency knows to pick up the item M at physical location X and to deliver the item to physical location Y.

At the third stage 303, the user account 111 (account 1) posts an item N at the platform 100, and the user account 119 (account 9) spends a take point to take the item N from the platform. In effect, the platform is notified that the user account 111 has posted an item N that is taken by the user account 119.

At the fourth stage 304, the platform generates shipping instructions 396 (e.g., shipping labels) to the shipping agency 390 to deliver the item N from the user of the account 111 to the user of the account 119. The platform generates the shipping instructions by mapping the account identifier of the accounts 111 to a physical location W and the account identifier of the account 119 to a physical location Z. The shipping instruction includes the physical locations W and Z so the shipping agency knows to pick up the item N at physical location W and to deliver the item to physical location Z.

As illustrated, the give-and-take platform 100 stores the shipping information of all user accounts in a database 310, and the platform 100 retrieves the shipping information of the sender and the receiver from the database 310 based on the account identities of the sender and of the receiver. In some embodiments, the account information database 310 does not directly store the physical locations of some of the user accounts, but rather just the information necessary for a location server 310 to physically locate the sender and/or the receiver. For example, in some embodiments, the account information database 310 includes information for receiving the present position (e.g., from global positioning system or GPS) of the mobile devices carried by some of the users. The location server 310 uses the mobile device information of the sender and/or the receiver user accounts to obtain the GPS positions of the sender and/or user. The GPS position is in turn used to generate physical locations for the sender and/or receiver for the shipping agency 390.

In some embodiments, the platform provides the origin and/or the destination city (but not the complete physical address) of the item being shipped to the user account responsible for paying the shipping cost. This gives the party responsible for shipment (usually the taker user or the receiver user) an opportunity to decline the transaction if the shipping cost is unacceptable.

Figure 11:
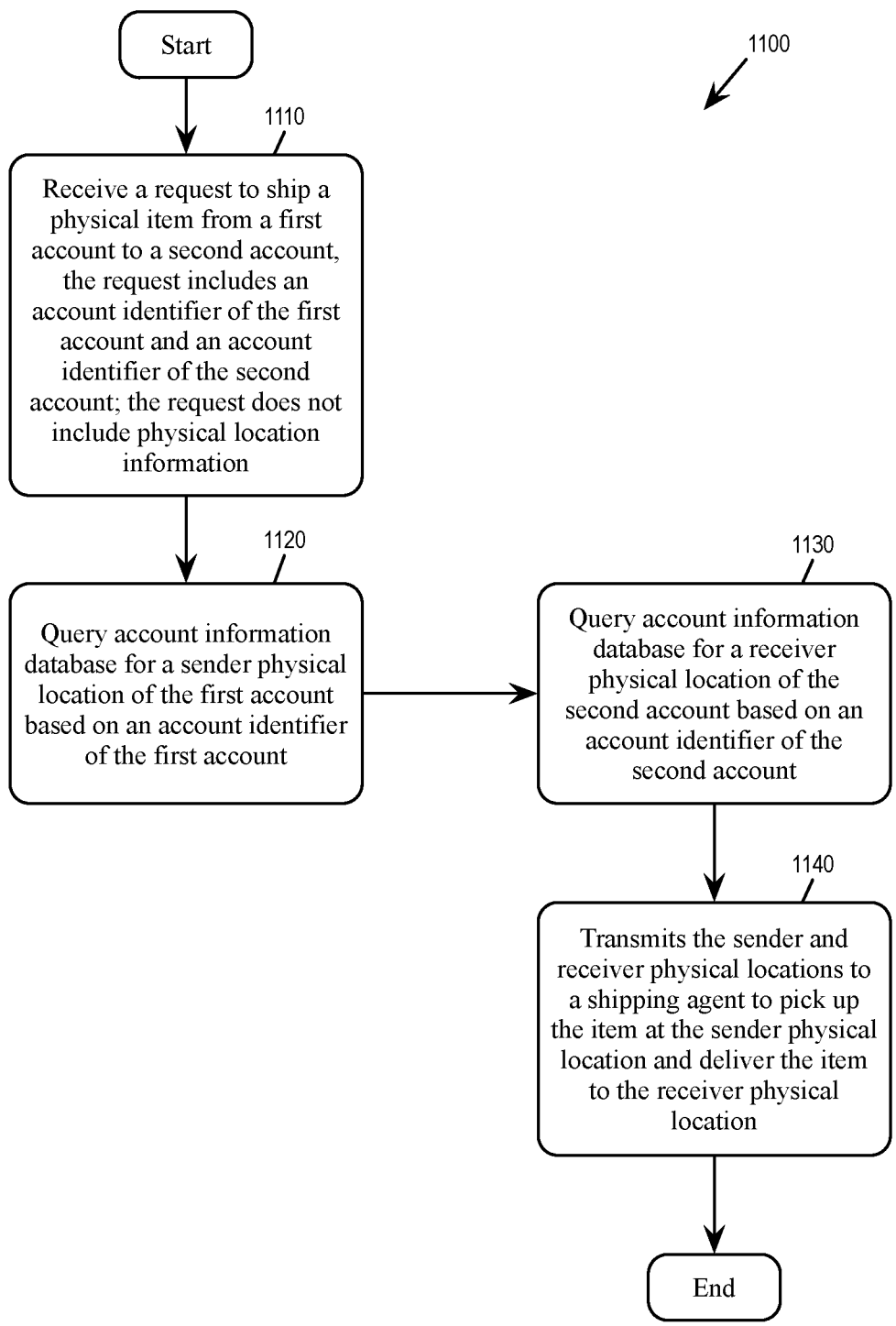
FIG. 11 conceptually illustrates a process performed by the give-and-take platform for arranging shipment of physical items between users of the platform.

FIG. 11 below further describes the operations performed by the give-and-take platform when facilitating the shipment of a physical item.

Figure 4:
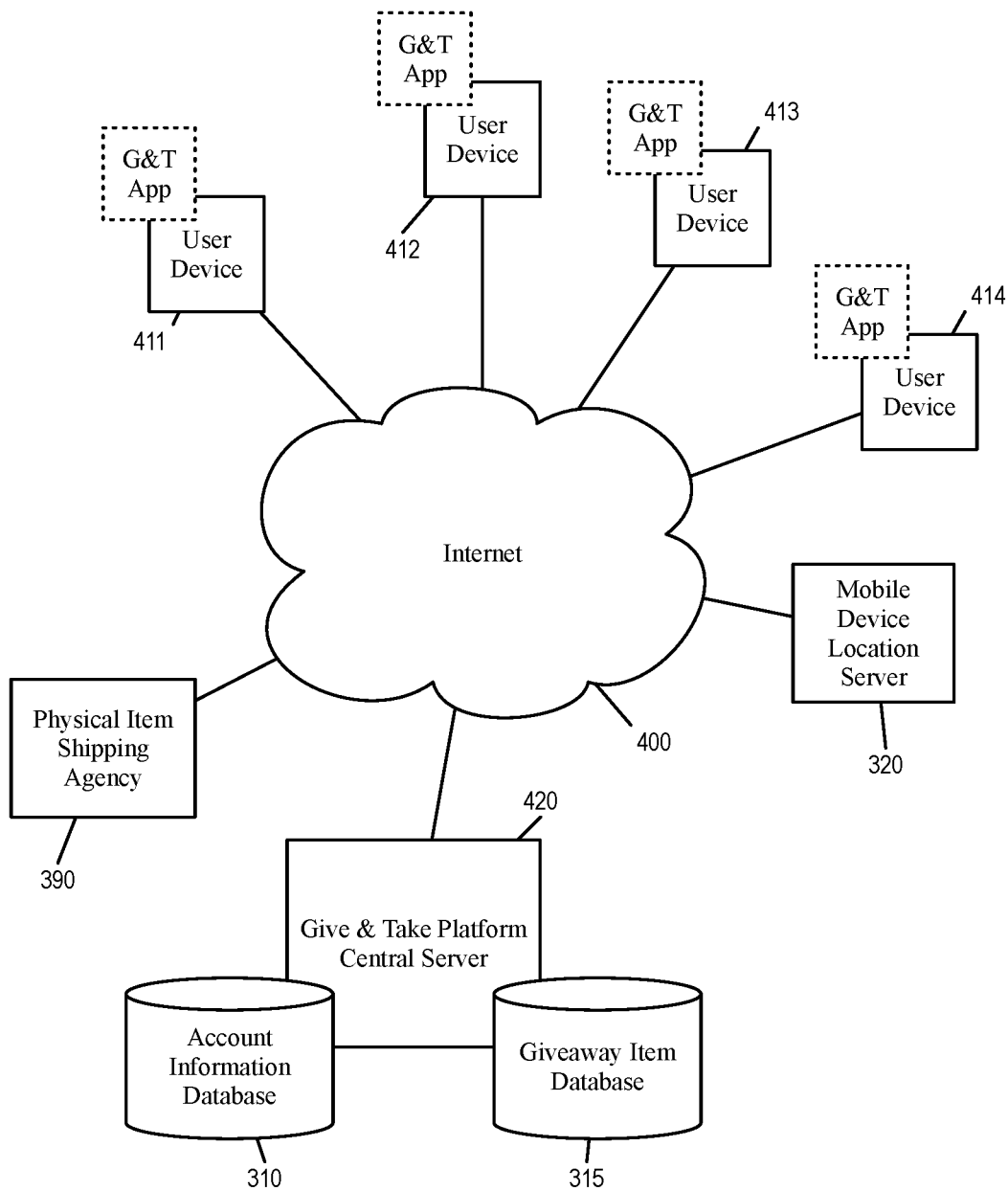
FIG. 4 conceptually illustrates the implementation of the give-and-take platform.

In some embodiments, the give-and-take platform is implemented across the Internet or computing cloud. Applications (or apps) running on personal computing devices communicate with each other as well as with a platform server across the Internet to facilitate give-and-take exchange. FIG. 4 conceptually illustrates the implementation of the give-and-take platform.

As illustrated, the give-and-take platform 100 is implemented across computing devices that are communicatively interconnected via a network such as the Internet 400. These computing devices includes user devices 411-411 as well as a give-and-take platform server 420.

Each user device of the give-and-take platform has a network interface for (wired or wirelessly) communicating with other computing devices through the Internet. Each user device also has a set of processing units for executing an application to participate in the give-and-take platform. Such a user device can be a wearable device, a smart phone, a tablet computer, a laptop computer, a desktop computer, or another type of computing device. The give-and-take platform application running on a user device provides a user interface that allows the user of the device to interact with the give-and-take platform, including to give and take items, to ship items, to manage the user's account at the platform, and to view information about other users of the platform, and to communicate with other users of the take platform.

Figure 6:
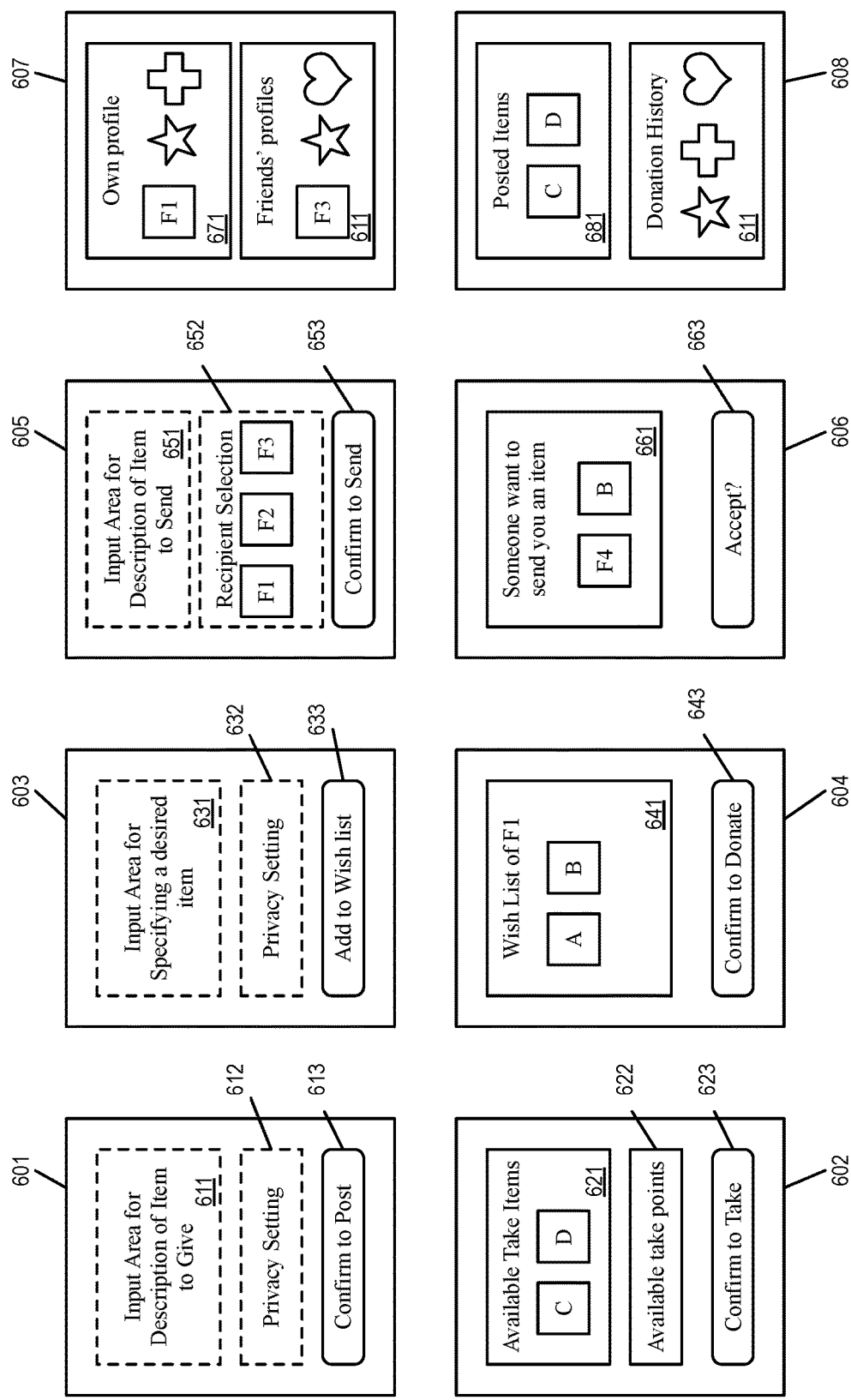
FIG. 6 illustrates an example user interface of an application running on a computing device for using the give-and-take platform.

FIG. 6 below illustrates an example graphical user interface (GUI) of the give-and-take platform application running at a user device.

The platform server 420 is a computing device equipped with storage for storing large amount of data as well as communications capabilities for responding to queries and providing requested data over the network 400 in a low latency manner. The platform server 420 centrally maintains the account information database 310 as well as an items database 315. The account information database 310 stores information regarding each user account. The items database 315 stores information regarding each giveaway item as well as each desired item.

Figure 7:
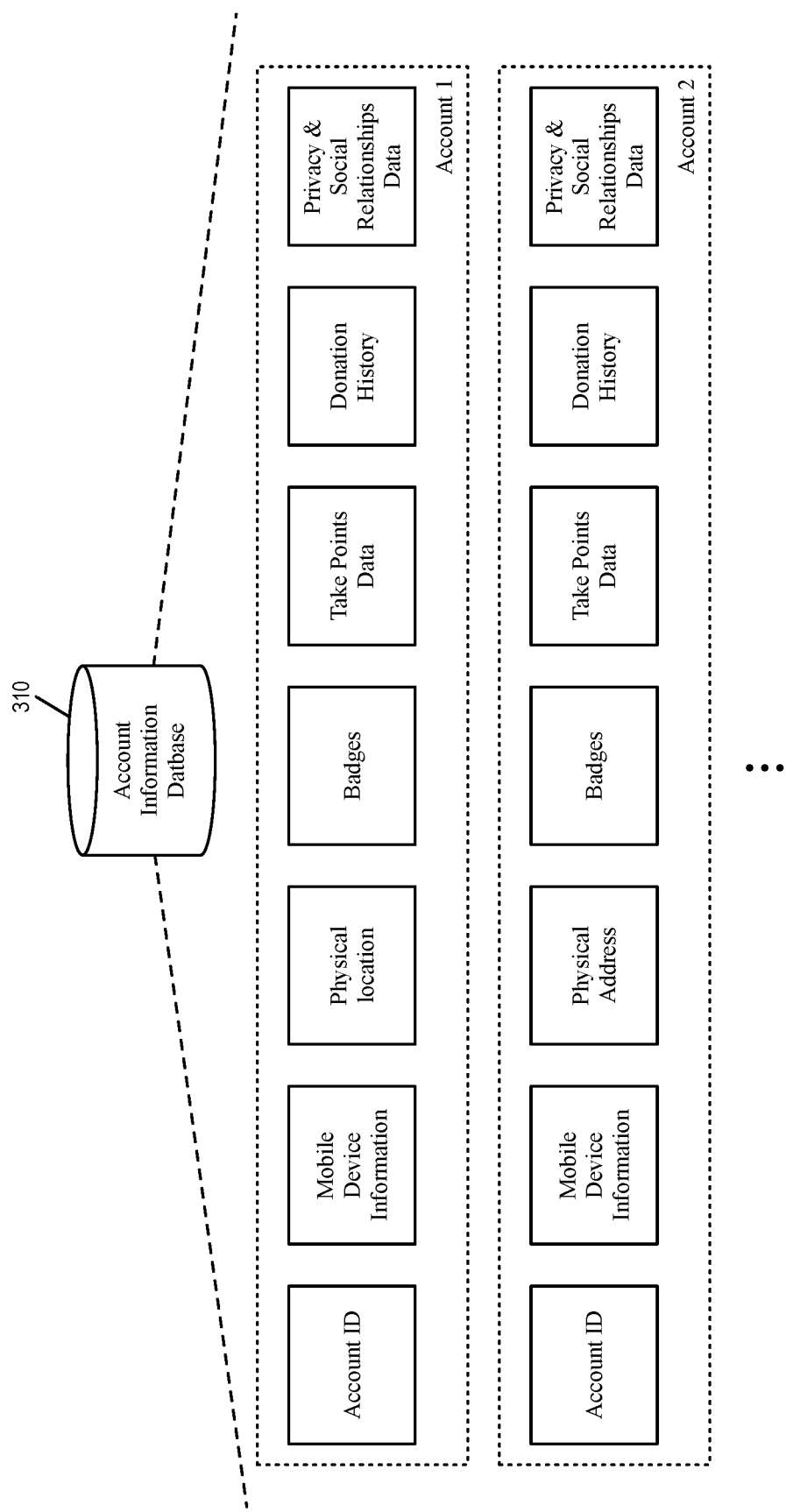
FIG. 7 illustrates the content of the account information database, consistent with an exemplary embodiment.
Figure 8:
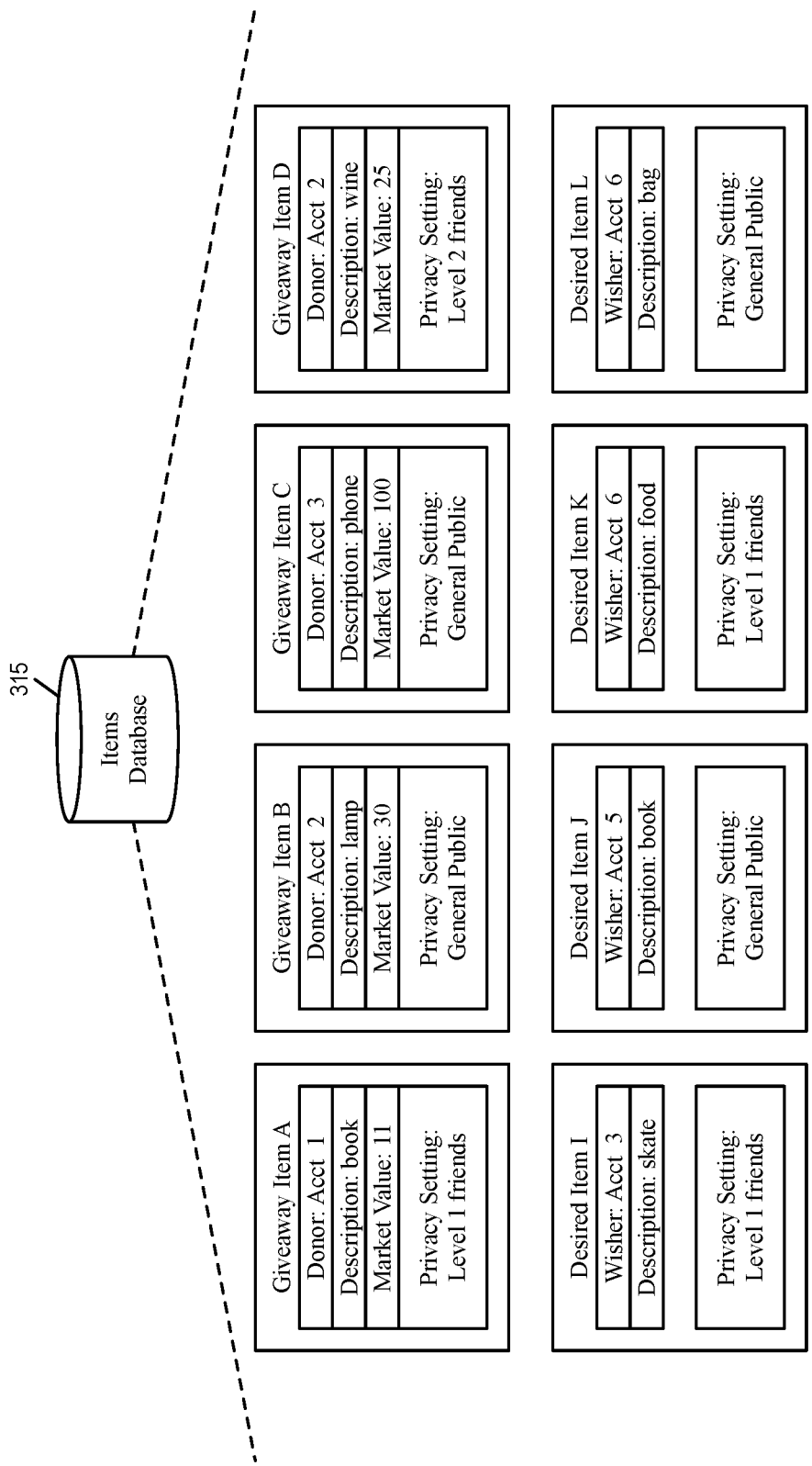
FIG. 8 illustrates the content of the items database, consistent with an exemplary embodiment.

The content of the account information database 310 and the giveaway item database 315 are stored at the give-and-take platform server 420 and is provided to the user devices 411-414 upon request. In some embodiments, the content of the account information database 310 and the giveaway item database 315 are stored and maintained by the user devices 411-414 in a distributed fashion. The items database 315 and account information database 310 may be stored in a same storage device or different storage devices. FIGS. 7 and 8 below illustrates example content of the account information database 310 and of the giveaway item database 315.

In some embodiments, as illustrated, the platform server 420 also communicates with the physical items shipping agency 390 and the mobile device location server 320 over the Internet 400.

Some embodiments provide the give-and-take platform application to a user device as an installation packages from an apps store. In some embodiments, the app store provides the installation package across the Internet. In some embodiments, a computing device authors the application and uploads the installation package of the give-and-take platform application to the app store.

Figure 5:
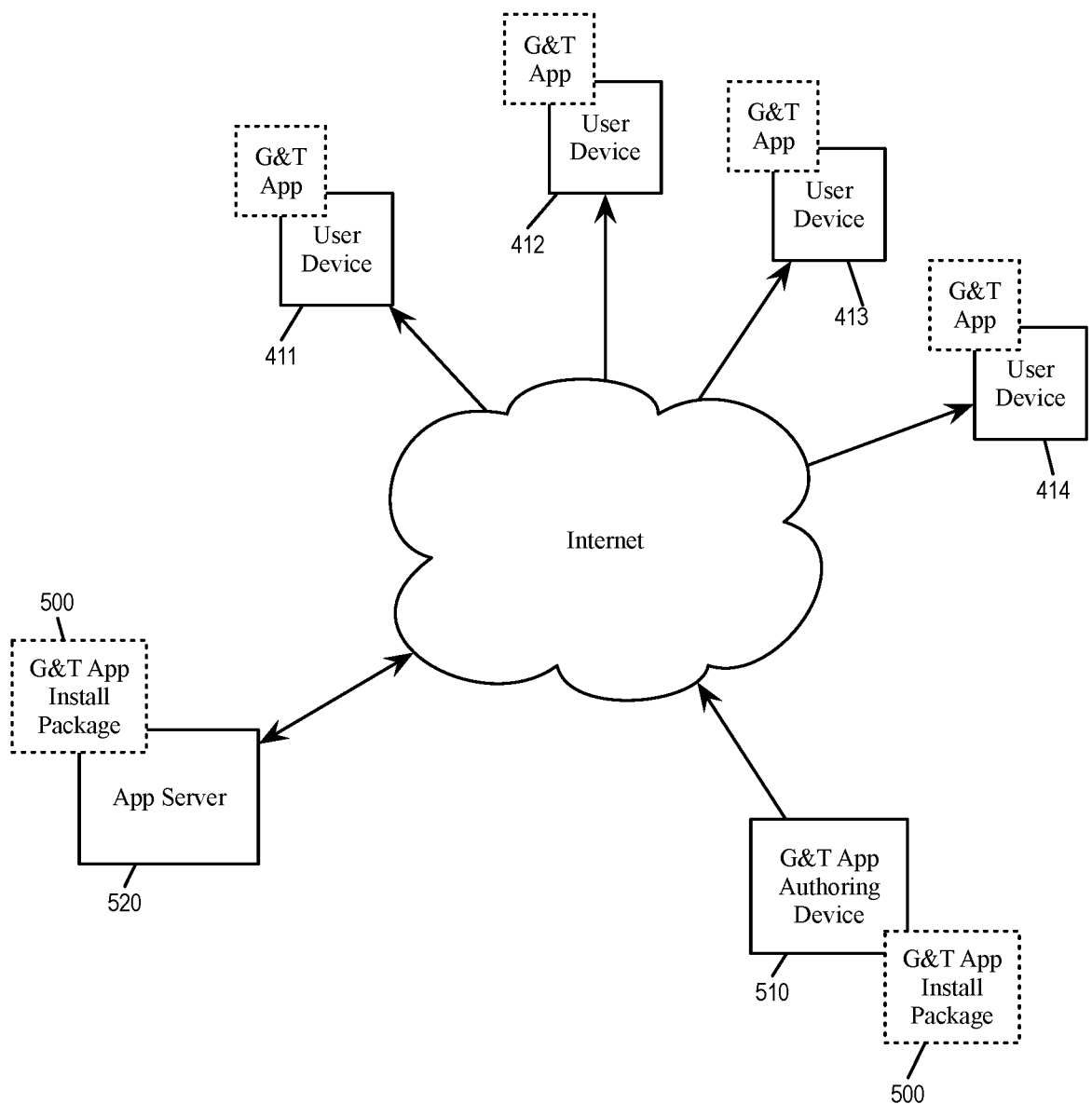
FIG. 5 illustrates the delivery of installation package for the give-and-take platform application to user devices.

FIG. 5 illustrates the delivery of an installation package for the give-and-take platform application to the user devices. As illustrated, an authoring computing device 510 generates an installation package 500 that would configure a user computing device to execute the give-and-take platform application and to provide the user interface for the give-and-take platform. The installation package 500 can be uploaded to an app server 520, which makes the installation package available for the user devices 411-414 to download (along with installation packages of other applications). The authoring computing device 510 can also directly provide the installation package 500 to the user devices 411-414 over the Internet.

FIG. 6 illustrates an example user interface 600 of an application running on a computing device for using the give-and-take platform. The figure illustrates eight example graphical user interface (GUI) displays 601-608 provided by the user interface 600 of the give-and-take platform application. Each GUI display includes one or more UI items, some of which can be used to generate input to the give-and-take platform. These UI items are illustrated with dashed lines.

The GUI display 601 includes an input area 611 for user to specify or describe an item to give away. It also includes an input area 612 for specifying the privacy setting of the item. This limits the visibility of the giveaway item to only user accounts allowed by the privacy setting. A privacy setting may specify that only designated friends may view the item, or may specify that anyone using the give-and-take platform may view the item. In some embodiments, the definition of "friend" can be imported from other social media applications or platforms. In some embodiments, the GUI provides a default privacy setting for the item (such as allowing only friends to view the item) that the user of the account may change. The display 601 also includes a GUI item 613 that the user can select to post the give away item at the platform. Though not illustrated, in some embodiments, the user interface 600 also allows the user to specify a market value for the item being posted.

The GUI display 602 includes a display area 621 for showing the giveaway items that are available for the user of this device (the device running the GUI) to take. In some embodiments, the items presented to the user is based on the privacy settings of the items, i.e., the user is only allowed to see items whose privacy settings do not exclude the user. The display 602 also includes a display area 622 for showing how much take point has the user accrued that the use may use to take one or more of the displayed giveaway items. Though not illustrated, in some embodiments, the take points are displayed with designer graphics that shows their meaning, such as birthday, limited edition, valentine, etc. The display 602 also includes a GUI item 623 that the user can select to confirm taking a selected item by spending/redeeming a take point.

The GUI display 603 includes an input area 631 for the user to specify or describe a desired item. The input area 631 allows the user to specify a desired item by selecting a giveaway item being posted at the platform. The GUI also allows the user to specify a desired item that is not one of the posted giveaway items at the platform. The GUI display 603 also includes an input area 632 for providing the privacy setting of the desired item. This limit the visibility of the desired item to only those allowed by the privacy setting, such as friends only or general public, so only those who are allow by the privacy setting knows that the user is wishing to have the specified item. In some embodiments, the definition of "friend" can be imported from other social media applications or platforms. The display 603 also includes a GUI item 633 that the user can select to confirm posting the desired item at the platform as a item in a wish list.

The GUI display 604 includes a display area that shows a wish list of a particular account of the platform, which maybe of the user of this device, a friend of the user, or any other user using the give-and-take platform. In some embodiments, the items presented to the user of this device is based on the privacy settings of the items, i.e., the user is only allowed to see wish list items whose privacy settings do not exclude the user.

The GUI display 605 includes an input area 651 for the user to specify or describe an item to send to the user account of another member. The display also includes an input area 652 for specifying a recipient of the item. In some embodiments, the input area 652 includes an array of GUI items (e.g., thumb nails) that corresponds to different possible recipients that the user may select to ship item. In some embodiments, the GUI does not provide an input area for specifying the physical location or address of the recipient. The display 605 also includes a GUI item 653 for confirming to send the item.

The GUI display 606 is a display showing a notification to the user that another member wants to send an item to the user. The display 606 includes a display area 661 that shows the identity of the sender user and the item being sent. Though not illustrated, the GUI display area 606 may also include a display area for showing the city of origin of the item. The display 606 includes a GUI item 663 for prompting the user to accept the item being sent. In some embodiments, the give-and-take platform would not allow shipment of an item of the proposed recipient does not accept the item (by e.g., using the GUI display 606).

The GUI display 607 is a display for showing information about one or more other users/members of the platform that the user of this device is allowed to see. These information may include take points (shown with designer graphics), badges (e.g., awards for having donated sufficient number of items), statistics, list of items given, list of items taken, currently posted giveaway item, currently posted wish list, etc.

The GUI display 608 is a display for showing information about the account of the user of this device, including the user's accrued take points (shown with designer graphics), badges, statistics, list of items given, list of items taken, currently posted giveaway item, currently posted wish list, etc.

FIG. 7 illustrates the content of the account information database 310, consistent with an exemplary embodiment. As illustrated, the account information database includes account information for each of the user/member accounts. The information stored for each user account may include an account ID, a mobile device information, a physical location, badges, take points data, a give and take history, and a privacy and social media relationships data. Some of the account information is obtained when the users initially create their accounts, information such as account ID, mobile device information, and physical location. Some of the account information is generated and updated by the give-and-take platform.

The account ID of a user is the identifier of the user in the give-and-take platform. This identifier can be one that is imported from another social media application or platform.

The mobile device information and the physical location of a user allow the give-and-take platform to determine where to pick up an item that the user is giving and where to deliver an item that the user is receiving or taking.

The badges of a user are virtual awards that the user has earned by using the platform, for example, some embodiments issue an "Angel Donor" badge to a user if the user has successfully given away more than a certain number of items over a period of time.

The take points data of a user maintains the accrual of take points through giving or other activities. The take points record also associates each take point with a meaning that can be used to display design graphics when the take point is presented for viewing at the GUI of the platform.

The donation history of a user records what items the user has given away and what items the user has taken. For each item given away by the user, the donation history also records the identity of the recipient as well as the market value of the item given away. The user may retrieve this record as evidence for charitable giving.

The privacy and social relationships data of a user keeps track of the social relations of the user, such as which other user/member is a close friend that is allowed to view certain giveaway or desired items, or which other user/member that the user may like to follow. In some embodiments, the social relationship data of the user can be imported from other social media platforms.

FIG. 8 illustrates the content of the items database 315, consistent with an exemplary embodiment. The items database stores information regarding items that are posted by individual users as giveaways. The platform presents giveaway items available for taking to each user based on the content of the items database 315. For example, the platform presents to each user items in the database 315 that the user is allow to view based on the privacy settings of the items.

As illustrated, the items database 315 stores information on giveaway items A, B, C, and D as well as desired items I, J, K, and L. For each giveaway item, the database stores the account identity of its donor/giver, its description, its market value, as well as its privacy setting. For each desired item, the database stores the account identity of the user that wishes to have the item, the item's description, as well as the item's privacy setting. In some embodiments, the items database does not record the market value of items since each item can be taken by redeeming one take point regardless of market value. In some embodiments, the give-and-take platform receives the market value of each item from the item's donor/giver. In some embodiments, the market value of each item is optional. In some embodiments, the give-and-take platform obtains the market value of each item by searching the Internet.

Each user of the platform may post multiple items (as giveaways and/or desired items) on the platform, and each item posted by the same user may have different privacy settings. For example, the user of account 2 posts both items B and D as giveaways. However, only "level 2" friends of the user may see item D while everyone using the platform may see item B. The user of account 3 posts both giveaway items C and desired item I, item C being visible by the general public and item I being visible by only "level 1" friends.

FIG. 9 conceptually illustrates a process 900 performed by the give-and-take platform to manage transactions based on take points. In some embodiments, one or more processing units (e.g., processors) of the give-and-take server are configured to perform the process 900 while in communications with individual user devices. In some embodiments, a user device performs the process 900 while presenting the user interface 600 to a user and being in communication with the platform server. In some of these embodiments, one or more processing units of the user device executing the give-and-take platform application (delivered by the installation package 500) is configured to perform the process 900.

The process 900 starts when the platform receives (at 910) a notification from a first user account for posting a giveaway item. The process also receives (at 920) a privacy setting that may limit visibility of the giveaway item to a subset of the users of the platform. The process then presents (at 930) the giveaway item to user accounts that comply with the privacy setting of the item. The item may be presented along with other giveaway items in a posting of available items for acquisition. In these instances, each user is presented with a set of giveaway items that are visible to the user based on the privacy settings of the giveaway items. The giveaway items presented to a user may have different monetary values.

The process 900 receives (at 940) a notification from a second user account indicating intent to acquire the posted item. The process then cancels (at 945) one take point from the second user account since the second user is spending a take point to take the posted item, according to the received notification. The process also arranges (at 950) transfer of the item from the first user account to the second user account. If the item being transferred is a physical item requiring physical shipping, the process would instruct a physical shipping agency to physically deliver the item from a physical location of the first user account to a physical location of the second user account. The process for shipping physical items will be described by reference to FIG. 11 below.

The process then receives (at 955) a notification that the item has been transferred. This notification may be generated based on a confirmation of receipt from the second account (receiver user). This notification may also be generated based on sufficient passage of time after successful delivery (e.g., 24 hours). In some embodiments, this notification is based on a confirmation that the item has been transferred out of the possession of the user of the first account (giver user). For a physical item, this notification indicates that the item has been physically delivered to the user of the second account. For a non-physical item such as a take point or a license to use an intellectual property, this notification may indicate that the non-physical item has been transferred to the second account. For a service item, this notification may be a confirmation to indicate that the service has been rendered to the user of the second account.

After receiving the notification that the item has been transferred, the process accrues (at 960) one take point to the first user account for giving away the item through the platform. The process 900 then ends. The first user account can then use the accrued take point for acquiring any one of items posted as available for acquisition at the give-and-take platform.

FIG. 10 conceptually illustrates a process 1000 performed by the give-and-take platform to manage the transaction of items in a wish list. In some embodiments, one or more processing units of the give-and-take server is configured to perform the process 1000 while in communications with individual user devices. In some embodiments, a user device performs the process 1000 while presenting the user interface 600 to a user and being in communication with the platform server. In some of these embodiments, one or more processing units (e.g., processor) of the user device executing the give-and-take platform application (delivered by the installation package 500) is configured to perform the process 1000.

The process 1000 starts when the platform receives (at 1010) a notification from a first user account for posting a desired item in a wish list. A desired item can be a giveaway item already posted at the platform. A desired item can also be an item that is not a posted giveaway item.

The process also receives (at 1020) a privacy setting that may limit visibility of the desired item to a subset of the users of the platform. The process then presents (at 1030) the desired item (as a part of a wish list) to user accounts that comply with the privacy setting of the desired item. The item may be presented along with other desired items as a wish list. In these instances, each user is able to see only the desired items that are visible to the user based on the privacy settings of the items.

The process receive (at 1040) a notification from a second user account indicating intent to give the desired item to the first user account in a targeted-giving transaction. The process then prompts (at 1050) the first user for acceptance of the item. If the first user declines the item, the process 1000 ends and targeted-giving transaction is aborted. If the first user accepts the item, the process proceeds to 1055.

At 1055, the process determines whether the desired item is a giveaway item posted by a third user account of the platform. If the desired item is not a giveaway item posted at the platform, the process proceeds to 1060 to arrange the transfer of the item from the second user account to the first user account without accrual or cancellation of take points. If the desired item is a giveaway item posted at the platform, the process proceeds to 1065.

At 1065, the process cancels one take point from the second account, since the second account user is spending one take point to take the item from the platform to give to the first user. The process also arranges (at 1070) the transfer of the item from the third user account to the first user account, since the item is in possession of the user of the third account.

The process then receives (at 1080) a notification that the item has been transferred. This notification may be generated based on a confirmation of receipt from the first account (receiver user). This notification may also be generated based on sufficient passage of time after successful delivery (e.g., 24 hours). In some embodiments, this notification is based on a confirmation that the item has been transferred out of the possession of the user of the third account (giver user). For a physical item, this notification indicates that the item has been physically delivered to the user of the first account. The process for shipping physical items will be described by reference to FIG. 11 below. For a non-physical item such as a take point or a license to use an intellectual property, this notification may indicate that the non-physical item has been transferred to the first account. For a service item, this notification may be a confirmation to indicate that the service has been rendered to the user of the first account.

After receiving the notification that the item has been transferred, the process accrues (at 1090) one take point to the third account for giving away the item through the platform. The process 1000 then ends.

FIG. 11 conceptually illustrates a process 1100 performed by the give-and-take platform for arranging shipment of physical items based on account identifiers. The platform performs this process when a user takes a posted giveaway item, when a user gives an item in response to a posted wish list, or when a user simply uses the platform to ship a physical item to a friend without using a take point. Specifically, some embodiments perform the process 1100 when performing the operation 950, the operation 1060, or the operation 1090.

In some embodiments, one or more processing units of the give-and-take server is configured to perform the process 1100 while in communications with individual user devices. In some embodiments, a user device performs the process 1100 while presenting the user interface 600 to a user and being in communication with the platform server. In some of these embodiments, one or more processing units (e.g., processor) of the user device executing the give-and-take platform application (delivered by the installation package 500) is configured to perform the process 1100.

The process starts when the platform receives (at 1110) a request to ship a physical item from a first user account to a second account. The request includes an account identifier of the first account and an account identifier of the second user account. In some embodiments, the request does not include any physical location information. In some embodiments, the give-and-take platform generates the request for shipping the physical item when a user takes a posted giveaway item, when a user gives an item in response to a posted wish list, or when a user simply uses the platform to ship a physical item to a friend without using any take points.

The process queries (at 1120) the account information database for a sender physical location of the first user account based on an account identifier of the first user account.

The process queries (at 1130) the account information database for a receiver physical location of the second account based on an account identifier of the second user account. The physical locations may be physical addresses stored in the account information database. The physical locations may also be GPS positions of mobile devices carried by the users of the accounts. More generally, the operations 1120 and 1130 map the account identifiers of the first and second user accounts into sender and receiver physical locations. In some embodiments, the platform would provide the origin and/or the destination city (but not the complete physical location) of the item being shipped to the user account responsible for paying for the physical shipping.

The process then transmits (at 1140) the sender and receiver physical locations to a shipping agent to pick up the item at the sender physical location and deliver the item to the receiver physical location. The process 1100 then ends.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 12:
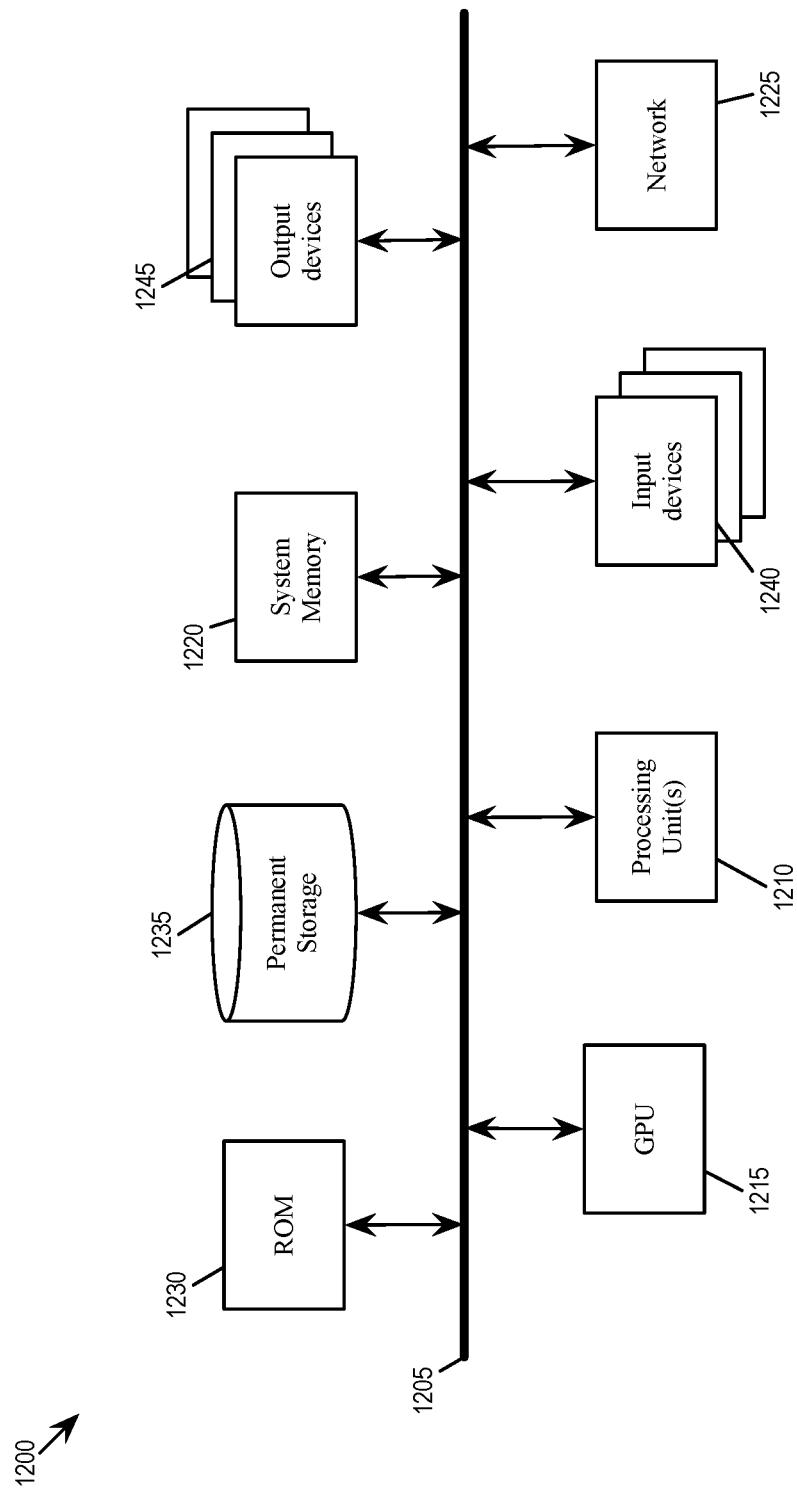
FIG. 12 conceptually illustrates an electronic system with which some embodiments of the invention are implemented.

FIG. 12 conceptually illustrates an electronic system 1200 with which some embodiments of the present disclosure are implemented. The electronic system 1200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1200 includes a bus 1205, processing unit(s) 1210, a graphics-processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the GPU 1215, the read-only memory 1230, the system memory 1220, and the permanent storage device 1235.

From these various memory units, the processing unit(s) 1210 retrieves instructions to execute and data to process in order to execute the processes of the present disclosure. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the present disclosure use a mass-storage device (such as a magnetic or optical disk and its corresponding disk drive) as the permanent storage device 1235.

Other embodiments use a removable storage device (such as a floppy disk, flash memory device, etc., and its corresponding disk drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor needs at runtime. In some embodiments, processes in accordance with the present disclosure are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 9, 10, and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
   presenting one or more giveaway items to a plurality of user accounts of a give-and-take platform, each giveaway item posted by a user account, wherein at least two of the giveaway items have different market values, wherein any user account is allowed to acquire any one of the presented giveaway items by spending one and only one unit credit;
   receiving a notification of a first user account indicating an intent to spend one unit credit to acquire a particular giveaway item that is posted by a second user account; and
   accruing one unit credit to the second user account and removing one unit credit from the first user account, wherein the one unit credit spent by the first user account is one of a plurality of unit credits possessed by the first user account, wherein at least two unit credits possessed by the first user account are displayed at a first display device using different graphics to express different meanings, wherein the one unit credit accrued to the second user account is one of a plurality of unit credits possessed by the second user account, wherein at least two unit credits possessed by the second user account are displayed at a second display device using different graphics to express different meanings.

2. The method of claim 1, wherein each giveaway item is associated with a privacy setting that is determined by the user account that posted the item.

3. The method of claim 2,
wherein the giveaway item is (i) visible over a network to a particular account at a remote display device when the privacy setting allows the giveaway item to be visible to the particular account and (ii) hidden over the network to the particular account at the remote display device when the privacy setting forbids the giveaway item to be visible to the particular user account.

4. The method of claim 1, wherein accruing one unit credit comprises associating the unit credit with a particular meaning and a graphic to express the particular meaning.

5. The method of claim 1, wherein presenting a giveaway item comprises presenting a market value for the giveaway item.

6. The method of claim 1, further comprising awarding a badge to a user account based on a number of items posted by the user account.

7. The method of claim 1, further comprising:
receiving a request by a third user account to give an item to a fourth user account;
receiving a notification of acceptance from the fourth user account;
accruing one unit credit to the third user account.

8. The method of claim 7, further comprising:
receiving a request to post a desired item from a third account;
receiving a request by a fourth user account to give the desired item to the third user account; and
receiving a notification of acceptance from the third user account.

9. A method comprising:
providing a software application to a computing device, the software application when executed by one or more processing units of the computing device configures the computing device to provide a user interface (UI) to a first user account of a plurality of user account of a give-and-take platform, the UI comprising:
a first display area for presenting a set of giveaway items, each giveaway item posted by a user account of the platform, wherein at least two of the giveaway items have different market values, wherein the first user account is allowed to acquire any one of the presented giveaway items by spending one and only one unit credit;
a first selection item for selecting one giveaway item in the set of giveaway items; and
a second display area for displaying one or more unit credits that is available to the first user account, wherein the first user account earns each unit credit by posting a giveaway item at the give-and-take platform,
wherein at least two unit credits possessed by the first user account are displayed at the second display area using different graphics to express different meanings.

10. The method of claim 9, wherein each giveaway item is associated with a privacy setting that is determined by the user account that posted the item.

11. The method of claim 10, wherein the giveaway item is (i) visible over a network to a particular account at a remote display device when the privacy setting allows the giveaway item to be visible to the particular account and (ii) hidden over the network to the particular account at the remote display device when the privacy setting forbids the giveaway item to be visible to the particular user account.

12. The method of claim 9, wherein displaying a unit credit comprises showing a graphic that expresses a particular meaning associated with the unit credit, wherein at least two unit credits have different graphics to show different meanings.

13. The method of claim 9, wherein the first display area presents each giveaway item with its market value.

14. The method of claim 9, wherein the UI further comprises a display area for showing one or more badges awarded to the first user account based on a number of items given away by the first user account.

15. The method of claim 9, wherein the UI further comprises a first input area to receive a specification of a giveaway item to be posted by the first account.

16. The method of claim 15, wherein the UI further comprises a second input area to receive a selection of a second user account as a recipient of the giveaway item.

17. The method of claim 9, wherein the UI further comprises a third display area to notify the first user account that another member of the give-and-take platform intends to send the first user account an item and a prompt for accepting the item.

18. The method of claim 9, wherein the UI further comprises a first input area to receive a specification of a desired item to be posted at the give-and-take platform.

19. The method of claim 9, wherein the UI further comprises a third display area to display a wish list of desired items of another member.

20. A computing device comprising:
a network interface;
a set of one or more processing units; and
a storage device storing a set of instructions, wherein an execution of the set of instructions by the set of processing units configures the computing device to perform acts comprising:
presenting one or more giveaway items to a plurality of user accounts of a give-and-take platform, each giveaway item posted by a user account, wherein at least two of the giveaway items have different market values, wherein any user account is allowed to acquire any one of the presented giveaway items by spending one and only one unit credit;
receiving a notification of a first user account indicating an intent to spend one unit credit to acquire a particular giveaway item that is posted by a second user account; and
accruing one unit credit to the second user account and removing one unit credit from the first user account;
wherein the one unit credit spent by the first user account is one of a plurality of unit credits possessed by the first user account, wherein at least two unit credits possessed by the first user account are displayed at a first display device using different graphics to express different meanings, wherein the one unit credit accrued to the second user account is one of a plurality of unit credits possessed by the second user account, wherein at least two unit credits possessed by the second user account are displayed at a second display device using different graphics to express different meanings.

\* \* \* \* \*